United States Patent [19]
Lungu et al.

[11] Patent Number: 5,343,106
[45] Date of Patent: Aug. 30, 1994

[54] SMALL SIZE ELECTRIC MOTOR WITH HOUSING PROVIDED WITH OPENING

[75] Inventors: Corneliu Lungu, Buehlertal; Hugo Herrmann, Lauf, both of Fed. Rep. of Germany

[73] Assignee: Robert Bosch GmbH, Stuttgart, Fed. Rep. of Germany

[21] Appl. No.: 885,161

[22] Filed: May 18, 1992

[30] Foreign Application Priority Data

Jun. 7, 1991 [DE] Fed. Rep. of Germany ... 9106978[U]

[51] Int. Cl.⁵ .................. H02K 5/14; H02K 13/00
[52] U.S. Cl. ......................... 310/239; 310/242; 310/245
[58] Field of Search .............. 310/40 MM, 89, 90, 64, 310/238, 239, 242, 244, 245, 51

[56] References Cited

U.S. PATENT DOCUMENTS

| | | | |
|---|---|---|---|
| 3,824,416 | 7/1974 | van de Griend | 310/51 |
| 4,118,647 | 10/1978 | Brenner et al. | 310/239 |
| 4,246,508 | 1/1981 | Zimmer | 310/242 |
| 4,355,253 | 10/1982 | Vollbrecht | 310/239 |
| 4,475,053 | 10/1984 | Mayer | 310/239 |
| 4,698,540 | 10/1987 | McKee | 310/239 |
| 4,758,757 | 7/1988 | Okumura | 310/244 |

FOREIGN PATENT DOCUMENTS

| | | | |
|---|---|---|---|
| 0180773 | 5/1986 | European Pat. Off. | 310/239 |
| 2311428 | 12/1976 | France | 310/239 |
| 0216438 | 12/1984 | Japan | 310/239 |
| 0043043 | 3/1985 | Japan | 310/239 |
| 0230339 | 10/1987 | Japan | 310/239 |
| 0018945 | 1/1988 | Japan | 310/239 |
| 0248938 | 10/1989 | Japan | 310/239 |
| 1354314 | 11/1987 | U.S.S.R. | 310/238 |
| 2163298 | 2/1986 | United Kingdom | 310/239 |

Primary Examiner—Steven L. Stephan
Assistant Examiner—C. LaBelle
Attorney, Agent, or Firm—Michael J. Striker

[57] ABSTRACT

A small size electric motor has a housing having an opening, a heat conductive bearing shield arranged to close the opening, a commutating device provided with commutator brushes in the housing. The bearing shield has a first guiding wall and at least one second guiding wall arranged at a distance from one another for guiding the commutator brushes. A heat conductive isolating layer is located between the guiding walls and the commutator brushes which are guided on the guiding walls with a small play.

16 Claims, 1 Drawing Sheet

U.S. Patent   Aug. 30, 1994   5,343,106
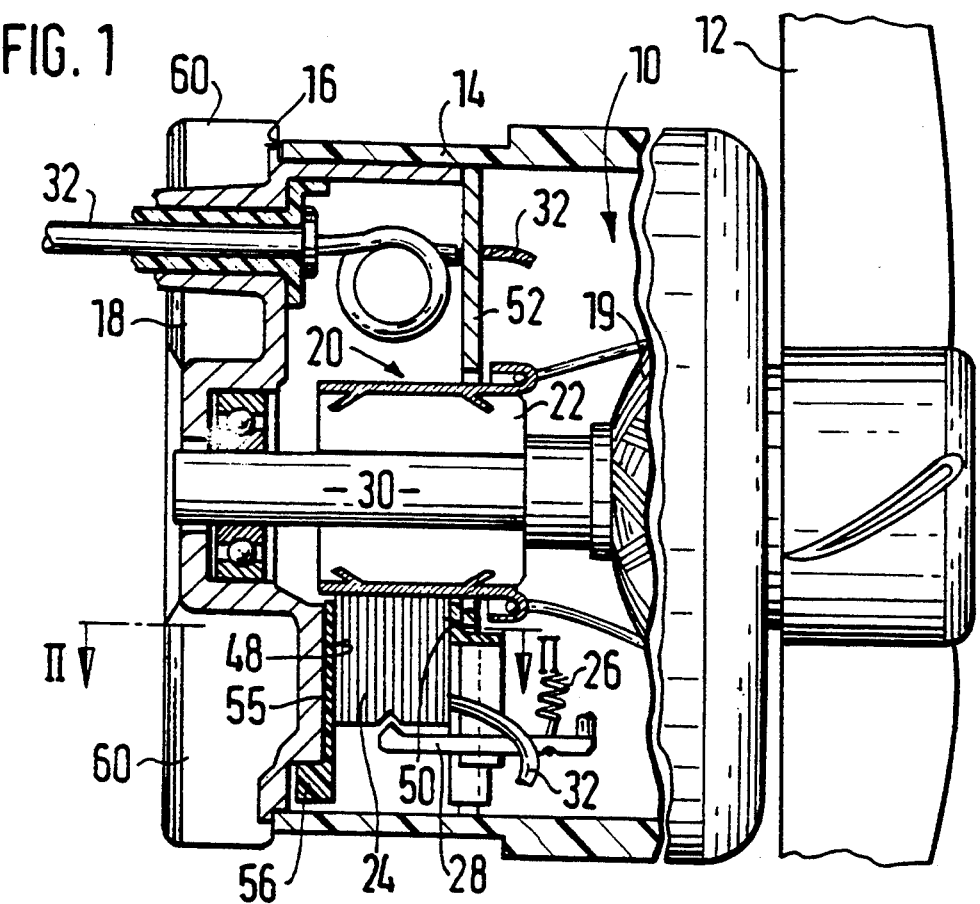
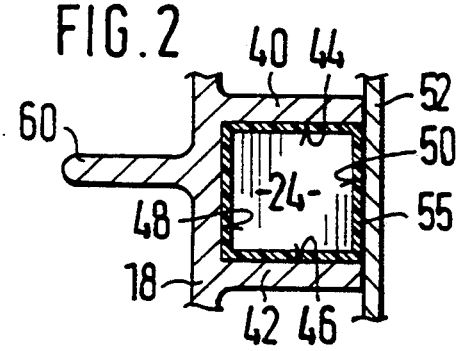
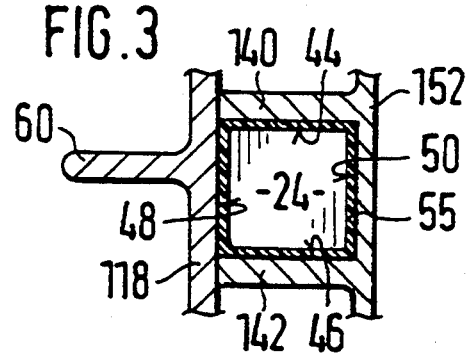
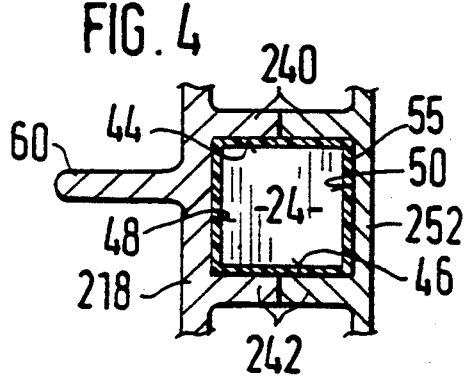
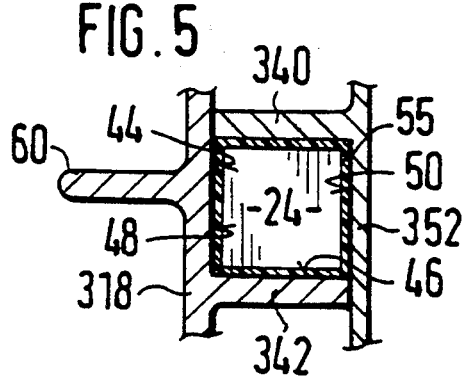

SMALL SIZE ELECTRIC MOTOR WITH HOUSING PROVIDED WITH OPENING

BACKGROUND OF THE INVENTION

The present invention relates to a small size or small power electric motor which has a housing provided with an opening and closed by a bearing shield having a guiding for commutator brushes of a commutator device.

Electric motors of the above mentioned general type are known in the art. In the known electric motors the brush holders which receive the commutator or carbon brushes are arranged in isolating fashion on a brush supporting plate which in turn is mounted on the motor housing. It has been shown that when such small size motors are designed with enclosure so that the motor interior is encapsulated or the motors do not have special inner ventilation, a high thermal loading of the commutator brushes occurs since the brush holders are cooled exclusively by the hot inner air of the motor. This has been taken into consideration since an additional ventilation, for example, by a separate fan, in small size motors would reduce the extremely low volumes of such motors. These problems surface especially when the small motors are used for driving a blower for cooling of internal combustion engines of a motor vehicle, since in this case the electric motor is also exposed to the heat flow of the cooling medium circulation for the internal combustion engine.

SUMMARY OF THE INVENTION

Accordingly, it is an object of the present invention to provide a small size electric motor which avoids the disadvantages of the prior art.

In keeping with these objects and with others which will become apparent hereinafter, one feature of the present invention resides, briefly stated, in an electric small size motor in which in addition to the guiding wall of the bearing shield, at least one further guiding wall is associated with a first mentioned guiding wall, and a heat conductive isolating layer is arranged between the guiding walls and the commutator brush which is slidingly guided between the guiding walls with a small play.

When the electric motor is designed in accordance with the present invention, it eliminates the disadvantages of the prior art.

In particular, due to the heat withdrawal to the bearing shield which is composed of high heat conductive material due to the narrow enclosure of the commutator brush by the guiding walls the temperature loading of the commutator brush drastically reduces, since in view of the large heat transfer surfaces and in view of the short heat transfer path outwardly the heat is withdrawn from the commutator brushes very fast.

The required electrical oscillation of the guiding walls is performed by the heat conductive isolating layer which has a minimum thickness and at the same time the heat produced on the commutator brushes is withdrawn very fast. Various materials can be used for this layer, such as for example polyester, polyimide, polyamide, rubber, mica, aluminum oxide, compound materials, filled textiles or cotton, mica paper, nomex, silicon glass fibers, resin-filled glass fabric. All materials must be very thin to provide a gap-free contact without hollow spaces and air inclusions both with respect to the guiding walls and with respect to the commutator brushes. The materials can be formed as punched out sheet elements in the form of foils or hoses, and in addition with self-adhesive one side. It is also recommended to apply this isolating layer as eloxal layer on the guiding walls.

The small size motor in accordance with the present invention has a simple construction. Due to the reduction of the heat loading of the commutator brushes, their service life is increased and the permissible power density for predetermined environmental conditions is increased, so that the efficiency is increased as well.

In accordance with the present invention the guiding walls are formed directly on the bearing shield. Also, the further guiding wall can be arranged on a further structural element which is a part of the motor.

In accordance with another embodiment of the invention, a part of the guiding walls is arranged on the bearing shield and another part of the guiding walls is arranged on another structural element. The walls are arranged opposite to one another.

Also, it is possible to provide on the bearing sheet two guiding walls which together form a U-shape. These three guiding walls can also be arranged on the additional structural element. On the other hand, two L-shaped guiding walls can be provided on the additional structural element.

The isolating layer can be fixedly connected with the guiding walls and form for example as an eloxal layer applied on the guiding walls.

On the other hand, the isolating layer can be formed as an envelope which is a separate structural element. Such envelope can be composed of rubber or synthetic plastic material. It can be tubular or hose-shaped and having a cross-section corresponding to the cross-section of the commutator brush.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a partial longitudinal section of an electric small size motor in accordance with the present invention for driving a blower;

FIG. 2 is a view showing a section taken along the line II—II in FIG. 1;

FIG. 3 is a view showing a section corresponding to the view of FIG. 2 but in accordance with another embodiment of the invention;

FIG. 4 is a view showing a section corresponding to the view of FIG. 2 but showing a further embodiment of the present invention; and FIG. 5 is a section corresponding to the view of FIG. 2 but showing still a further embodiment of the present invention.

DESCRIPTION OF THE PREFERRED EMBODIMENTS

An electric drive motor is identified as a whole in FIG. 1 with reference numeral 10. It serves for driving a blower wheel 12 which is a part of a not shown cooling device for an internal combustion engine of a motor vehicle. The electric drive motor has a cup-shaped housing 14 with an opening 16 which is closed by a bearing shield 18. The bearing shield 18 is a part of the housing of the motor.

A motor armature 19 in addition to the not shown permanent magnets is accommodated in the housing 14, 18. The electrical motor 10 also has a commutating device 19 which in the shown embodiment has a collector 22 formed as a drum. Commutator brushes 24 are mounted on the outer surface of the drum collector 22 by means of pre-stressed pressing springs 26. The force of the pressing springs 26 is transferred through a lever 28 to the commutator brushes 24. The drum collector 22 is arranged on end 30 of an armature shaft. Its another not shown end is provided with the air wheel 12. Supply cables 32 extend through the bearing shield 18 and are connected to the commutator brushes 24. The bearing shield 18 is composed of a high heat conductive material.

In a first embodiment shown in FIG. 2, two projections 40 and 42 are formed on the bearing shield 18 at a distance from one another. Their surfaces which face toward one another and are spaced from one another form guiding walls 44 and 46 for the commutator brushes 24. The inner wall 48 of the bearing shield 18 also forms a guiding wall for the commutator brushes 24. A further guiding wall 50 is located opposite to the guiding wall 48 and is formed on another structural element 52 of the electric drive motor 10. The structural element is a ring-shaped plate which is fixed in the interior of the housing 14. The guiding walls 44, 46, 48 are arranged in a U-shape. This U-shape is closed with the guiding wall 50 formed on the guiding ring. Therefore, a completely peripherally enclosed guiding passage is provided and oriented radially relative to the drum collector 22.

A heat conductive isolating layer 55 coats the guiding walls 44, 46, 48, 50. The thickness of the isolating layer is selected so that a sufficient electric isolation of the commutator brushes 24 is guaranteed on the one hand and on the other hand a fast withdrawal of the heat produced on the commutator brushes 24 through the isolating layer 55 is provided. The determination of the cross-sectional size of commutator brushes 24 with respect to the cross-sectional size of the passage enclosed by the guiding walls 40, 42, 18, 52 is selected so that with the above described preferably thickness the heat conductive isolating layer 55 provides a maximum play-free sliding displacement of the commutator brushes.

In the embodiment shown in FIG. 3, the guiding walls 44 and 46 are provided on projections 140 and 142 of a structural element 152 of the motor. Similarly to the first embodiment, the guidance is also provided by the guiding walls 44, 46, 48, 50 arranged on the projections 140, and 142 and on the bearing shield 118 and the structural element 152.

In the embodiment of FIG. 4 projections 240 and 242 are arranged both on the bearing shield 218 and the structural element 252. The leg length of the projections 240 and 242 is only half length of the projections in the embodiments of FIGS. 2 and 3. The guiding walls 44, 46, 48, 50 are again formed on the facing surfaces of the projections 240 and 242 and on the bearing shield 218 and the structural element 252.

In the embodiment of FIG. 5 the guiding passage for the commutator brushes 24 is formed by an L-shaped arrangement of the guiding walls 44, 50 or 46, 48. This L-shape forms on the bearing shield 318 a projection 342 and on the structural 352 a projection 340. The guiding walls 44, 46, 48, 50 ar formed on the projections 340 of the structural elements 352, 342 of the bearing shield 318, as well as on the bearing shield 318 and the structural element 352.

The arrangement and design of the heat conductive isolating layer 55 coincides in all above described embodiments. For better heat withdrawal in all embodiments a number of cooling ribs 60 are formed on the bearing shield 18, 118, 218, 318. The heat conductive isolating layer can be composed especially from the following materials: polyester, polyimide, polyamide, ceramic foils, rubber especially silicon rubber, mica, aluminum oxide, compound materials, filled textiles or cotton, mica paper, nomex, silicon glass fibers, resin-filled glass fibers. The isolating layer 55 can be formed for example by coating one or several guiding walls 44, 46, 48, 50. This coating can be produced by immersion processes, vacuum processes by means of so-called powder coating process, or in electrostatic process. In certain cases it is recommended to form the isolating layer as eloxal layer (a layer applied by anodizing) on the guiding walls 44–50. It is advantageous when the structural elements 18, 118, 218, 318 or 52, 152, 252, 352 which carry the guiding walls are composed of a light metal which has a little silicon as possible. The eloxal layer ensures not only high electrical isolation but also a pronounced heat transfer from the commutator brushes to the bearing layer 18.

It is however recommended to form the isolating layer 55 as a separate part. Such an envelope or encasing can be hose-shaped and its cross-section can correspond to the cross-section of the commutator brushes 24. Therefore, on the one hand the heat conductive isolating layer abuts against the guiding walls in a play-free and air-bubble-free manner, and on the other hand, commutator brushes 24 are slidingly displaced inside the envelope also in a play-free manner. In this way a fast withdrawal of the heat through the housing 14, especially through the bearing shield 18 and the cooling ribs 60 is provided. For preventing displacement of the envelope 55 in direction of the commutator 22 from the guiding passage, the housing-fixed end is provided with a bead 56.

It is to be understood that it is not necessary to arrange the heat conducting isolating layer on all guiding walls for the commutator brushes when the structural element which has the respective guiding wall is electrically isolated at another location.

Some of the possible isolating layers 55 in addition to the above specified advantages can also have high damping properties with respect to the vibrations of the commutator brushes. Therefore, they also at least substantially reduce the noise connected with such vibrations.

It will be understood that each of the elements described above, or two or more together, may also find a useful application in other types of constructions differing from the types described above.

While the invention has been illustrated and described as embodied in a small size electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A small size electric motor comprising a housing having an opening; a heat conductive bearing shield arranged to close said opening; a commutating device provided with commutator brushes in said housing, said bearing shield having a first guiding wall and at least one second guiding wall arranged at a distance from one another for guiding said commutator brushes; and a heat conductive isolating layer located between said guiding walls and said commutator brushes which are guided on said guiding walls with a small play, said heat conductive isolating layer being composed of rubber so as to perform heat isolating and dampening functions simultaneously, while the bearing shield having said guiding walls being composed of a light metal and at its side opposite to said commutator being cooled by air which surrounds said motor.

2. A small size electric motor as defined in claim 1, wherein said guiding walls are formed on said bearing shield.

3. A small size electric motor as defined in claim 1; and further comprising a structural element, said second guiding wall being arranged on said structural element.

4. A small size electric motor as defined in claim 1; and further comprising a structural element, a part of said guiding wall is formed on said guiding shield and another part of said guiding walls being formed on said structural element.

5. A small size electric motor as defined in claim 4, wherein said guiding walls arranged on said bearing shield are located opposite to said guiding walls arranged on said structural element.

6. A small size electric motor as defined in claim 1, wherein said bearing shield has a third guiding wall, said guiding walls being arranged so as to form U-shape.

7. A small size electric motor as defined in claim 1; and further comprising an additional structural element and a third guiding wall, said three guiding walls being arranged on said structural element and form a U-shape.

8. A small size electric motor as defined in claim 1; and further comprising a structural element, said first guiding wall being arranged on said bearing shield and having an L-shape, said second guiding wall being arranged on said structural element and also having an L-shape.

9. A small size electric motor as defined in claim 1, wherein said isolating layer is fixedly connected with said guiding wall.

10. A small size electric motor as defined in claim 1, wherein said isolating layer is formed as an eloxal layer applied on said guiding wall.

11. A small size electric motor as defined in claim 1, wherein said isolating layer is formed as separate structural element in form of an envelope.

12. A small size electric motor as defined in claim 11, wherein said envelope is tubular and has a cross-section corresponding to a cross-section of said commutator brushes.

13. A small size electric motor as defined in claim 11, wherein said envelope is hose-shaped and has a cross-section corresponding to a cross-section of said commutator brushes.

14. A small size electric motor as defined in claim 1; and further comprising a structural element carrying one of said guiding walls while said bearing shield carries another of said guiding walls, said structural element being also composed of a light metal with a minimum silicium.

15. A small size electric motor as defined in claim 1; and further comprising means for driving a blower for cooling an internal combustion engine of a motor vehicle.

16. A small size electric motor comprising a housing having an opening; a heat conductive bearing shield arranged to close said opening; a commutating device provided with commutator brushes in said housing, said bearing shield having a first guiding wall and at least one second guiding wall for guiding said commutator brushes; and a heat conductive isolating layer located between said guiding walls and said commutator brushes which are guided on said guiding walls with a small play, said heat conductive isolating layer being composed of rubber so as to perform heat transfer, electrical insulation and dampening functions simultaneously, while the bearing shield having said guiding walls being composed of a metal and at its side opposite to said commutator being cooled by air which surrounds said motor.

* * * * *